Figure 1:
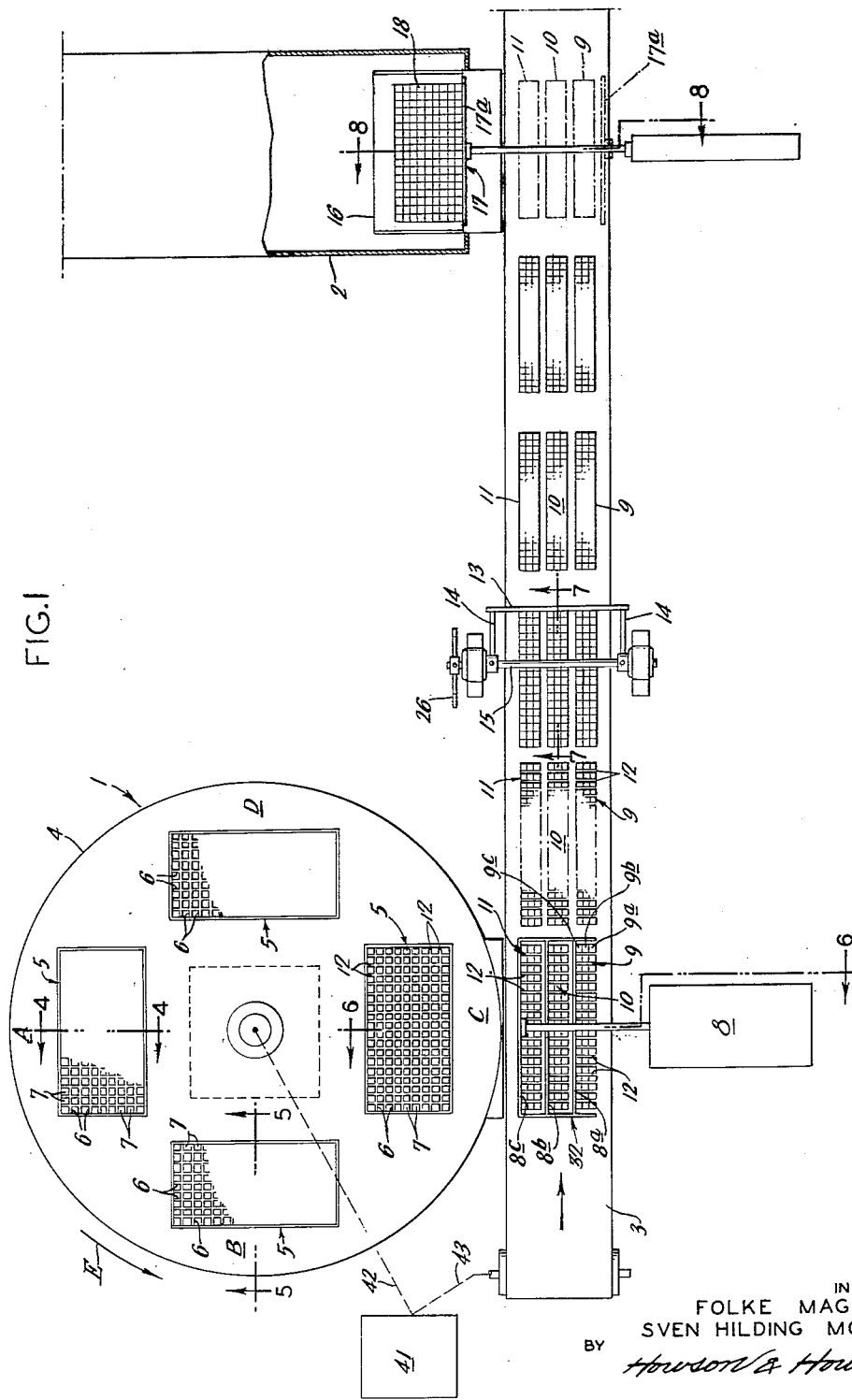

Feb. 25, 1964

F. MAGNUSSON ETAL 3,122,107

MANUFACTURING LUMP SUGAR

Filed Nov. 28, 1960

3 Sheets-Sheet 3

INVENTORS:
FOLKE MAGNUSSON
SVEN HILDING MONTÉUS
BY Howson & Howson
ATTYS

United States Patent Office 3,122,107
Patented Feb. 25, 1964

3,122,107
MANUFACTURING LUMP SUGAR
Folke Magnusson, Stockholm, and Sven Hilding Montéus, Landskrona, Sweden; said Magnusson assignor to Aktiebolaget Svenska Flaktfabriken, Stockholm, Sweden; said Montéus assignor to Aktiebolaget Landsverk, Landskrona, Sweden
Filed Nov. 28, 1960, Ser. No. 72,109
Claims priority, application Sweden Dec. 2, 1959
2 Claims. (Cl. 107—15)

The present invention relates to manufacturing sugar lumps wherein moist sugar is compressed into lump form in a press having an intermittently rotating table and the lumps are transferred from the press to transporting shelves in a drying plant by a conveyor equipped with loading and unloading means.

When manufacturing sugar lumps one has hitherto performed the method in such a way that granulated sugar has been formed in a suitable press into rod form having a cross section corresponding to the desired size of the sugar lumps or cubes. These rods have then been dried and thereafter been transferred to a special cutting machine where the rods have been divided into a number of small sugar cubes of desired size. For several reasons for a long time it has been desirable to eliminate the cutting. One reason for this is that the cutting machine involves an increased cost for the plant and that the cutting and the corresponding additional transfers result in an increase of the time and cost for the manufacturing. Another reason is that the cutting cannot be carried out without a certain waste of material. The last but however possibly most essential reason for providing a new method for manufacturing lump sugar is that by cutting it is not possible to give throughout the sugar lumps the exact and appealing form which is desirable with respect to the present wishes of the consumers.

The method according to the invention eliminates the abovementioned drawbacks and makes possible economical manufacturing of sugar lumps of high quality in all respects. The sugar lumps are manufactured in the press as separate pieces with free space between the lumps. During the pushing of the lumps from the press to the band conveyor, they are put together to form two or more bars parallel with the band conveyor and arranged in adjacent rows. The sugar lumps in each of the different bars, which are spaced apart in the direction of movement, at a certain position during the transport are pushed close to each other whereafter the lumps in this condition are transported to the intended loading position of the drying plant. The bars before or during their pushing over to the shelves of the dryer are put together to form a block of adjacent bars.

When carrying out our method, the proper pressing is suitably so performed that the sugar lumps are manufactured in three steps on a table having a press container or mold divided into a number of similar chambers which are separated from each other by walls and which have a cross sectional area corresponding to the intended size of sugar cubes. In the first step, the granulated sugar is poured into the container, so that each chamber contains a quantity of sugar corresponding to that of one single sugar lump. In the second step, the sugar in each chamber, after the turning of the table 90°, is compressed into lump form by means of a press piston arranged in each chamber. In the third step and after the further 90° turning of the table, the pressed cubes are lifted up to the upper face of the table in order to be transmitted thereafter to the band conveyor.

The invention also provides a device for carrying out the new method which device besides said press and table comprises an intermittently driven transporting band situated between the press and the drying plant and equipped with necessary loading and unloading means. It is new and characteristic for the device that the loading means consists of a frame equipped with a number of pulling plates parallel with the transporting band and corresponding in number to the intended number of bars on the band, said frame being guided to return in a raised position and that the unloading means consists of a pulling member known per se and being made with only one pulling plate.

For effecting the pushing together of the sugar cubes while being transported on the band, which sugar cubes are separated in the direction of movement of the band, the device is suitably so designed that the device besides the loading and unloading means mentioned above is equipped with a stop edge which may be raised and lowered transversally over the transporting band and which functions as a stopping means. The edge is held lowered in contact with the transporting band and thereafter temporarily is lifted and during the remaining part of the interval is held in a raised position.

A preferred embodiment of the device includes control means for the stop means comprising electromagnets or solenoids which are governed by means of two photoelectric cells arranged adjacent the transporting band and spaced apart along the band at a distance corresponding to the length of the bars being pressed together.

Figure 2:
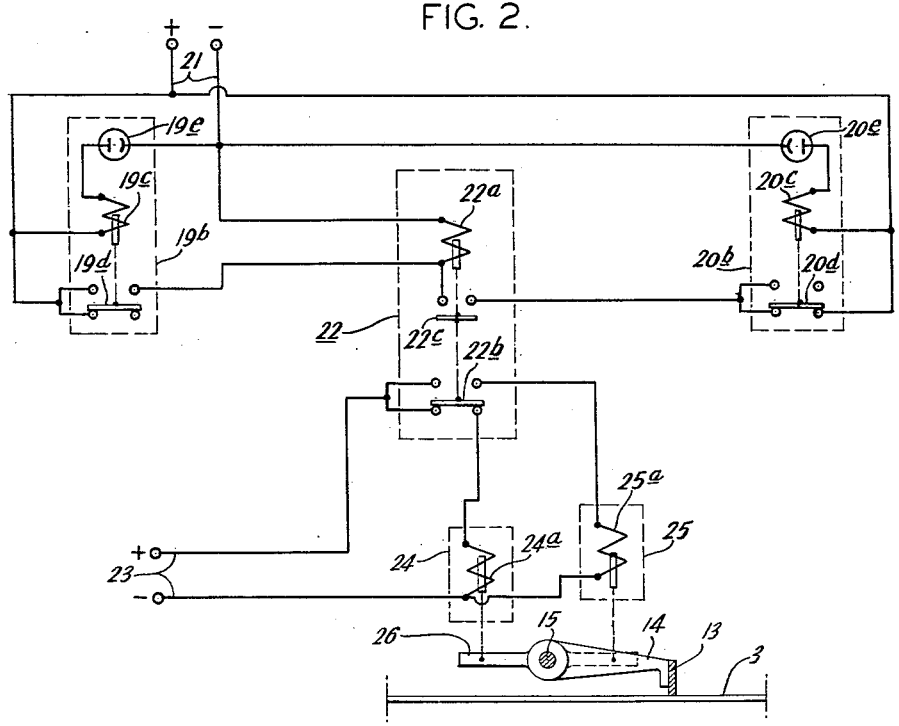
Figure 3:
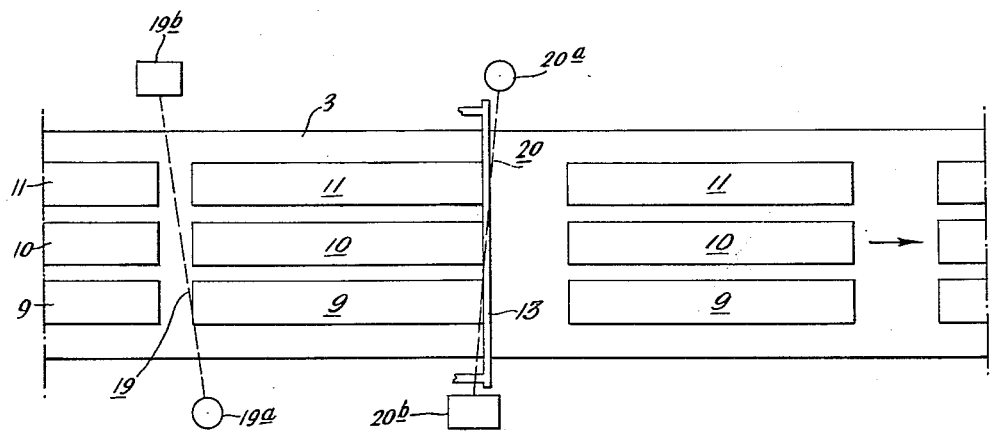

The invention will now be described more in detail with reference to accompanying drawings wherein FIG. 1 shows in a schematic view a device for carrying out the method according to the invention;

FIG. 2 shows a diagram of a circuit for automatically controlling the stopping means on the transport band;

FIG. 3 is a fragmentary plan view of the transport band showing the location of the photoelectric cells belonging to the automatic control means; and FIGS. 4 to 8 inclusive are sectional views taken on correspondingly identified section lines of FIG. 1, showing suitable mechanism for performing the operations of the procedure for forming the lumps of sugar in the press and compacting the same for insertion into the dryer.

In the drawings, the illustrated apparatus comprises a press 1 having a table 4 which is rotated step-by-step by drive means 41 through connecting mechanism shown schematically at 42, to form sugar lumps, and a drying plant 2 for drying the lumps. For the transmission of the pressed sugar from the press to said drying plant, there is arranged a transporting band 3 which is driven intermittently and synchronized with the movement of the press table as indicated schematically at 43.

Figure 4:
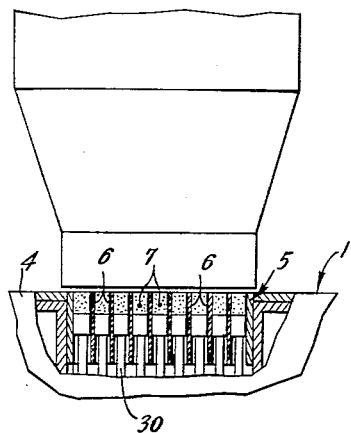
Figure 5:
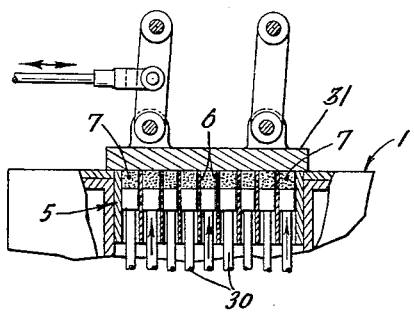
Figure 6:
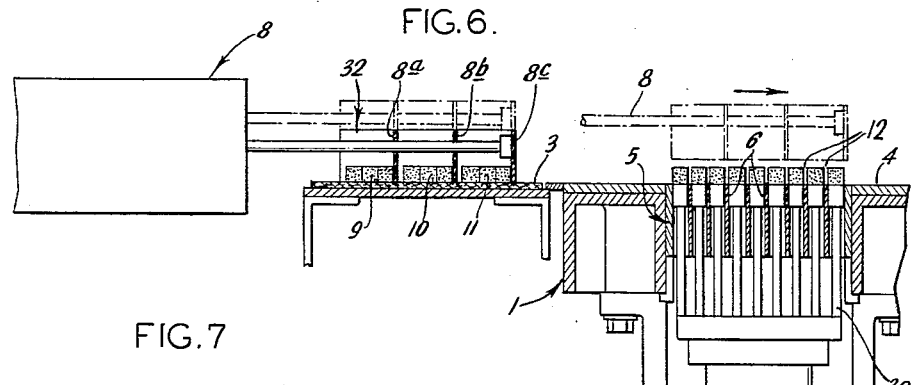
Figure 7:
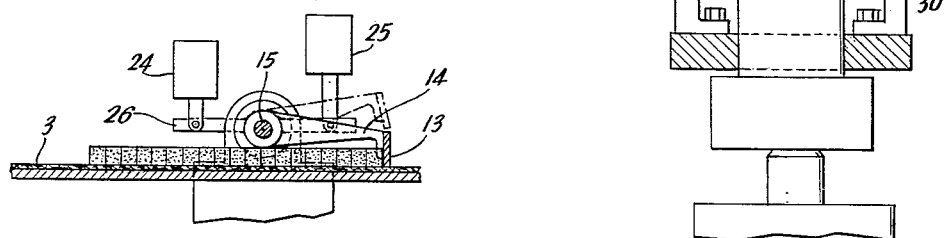
Figure 8:
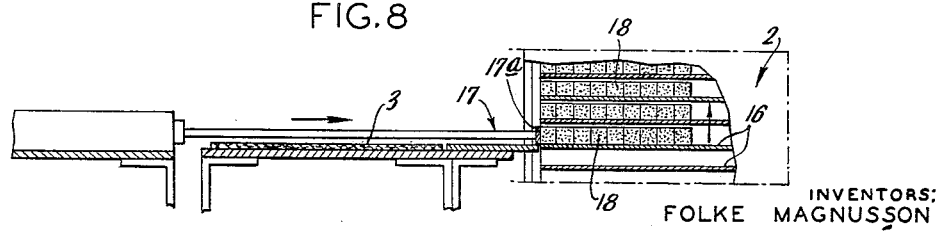

In the rotatable table 4, there are four press containers or molds 5 placed each in a 90° sector of the press table so that upon rotation step-by-step of the table said containers successively are put in four different working positions, in the drawings designated A, B, C and D. The press containers are by means of partitions 6 divided in a number of mutual similar spaces or chambers 7 having a cross sectional area corresponding to the intended size of the cube and having a volume corresponding to the quantity of sugar of one single sugar cube. In position A granulated sugar is poured into the press container situated at the moment in this position as indicated in FIG. 4, whereafter the table is rotated 90° in the direction of the arrow E so that said press container takes the working position B. Here the proper pressing takes place owing to that the loose sugar is compressed by means of the press pistons 30 located in the chambers 7, which press the sugar against a stopping means, for example a plate 31 shown in FIG. 5 of the drawings which in this position has been pushed forward over the press container. After this second step the table is turned 90° further so that the press container comes into the position C. In this position the shaped sugar cubes are lifted to the plane of the upper face of said table by means of said press pistons.

In order to be put in position to be transferred to the transport band 3 situated adjacent and at the same level as the press table 4, the transfer is carried out by means of a loading means 8 comprising a frame 32 movable forwards and backwards, which frame in the illustrated form of the invention is equipped with three pulling plates 8a, 8b and 8c. When the frame is pushed over the press table it is held in a raised position as indicated in broken lines in FIG. 6 and is then lowered so that said pulling plates are moved towards the table in registry with the partitions of the press container i.e. in certain of the spaces between the rows of sugar cubes and behind the whole set of sugar cubes. When the set of sugar lumps during the movement of the loading means is pushed over to the transport band the sugar lumps will be put together to three bars 9, 10 and 11, each comprising three adjacent rows of sugar cubes 9a, 9b and 9c etc. Afterwards the table is turned 90° further, so that the press container, now being empty, is put into the position D for cleaning whereafter the pressing cycle is repeated.

The above mentioned pushing together of the rows of sugar lumps in accordance with the invention insures that the sugar cubes, still being moist and very fragile, will in a certain degree support each other so that the sugar cubes without any risk of being damaged can be transported on the band and bear the strains occurring in connection with the repeated starts and stops of the transporting band. Reckoned in the direction of the transporting band the sugar lumps are still positioned with spaces 12 formed by the partitions of the press container, but to diminish further the risk of damage, a pushing together of the sugar cubes takes place also in this direction. This is accomplished by means of a stop edge 13 which may be raised and lowered to function as stop means and which is arranged transversely across the transport band. In the illustrated form of the invention, the stop 13 is fastened by means of arms 14 to a rotatable shaft 15. As the sets of sugar lumps reach a position opposite the end of the drying plant 2 they are transmitted from the transporting band to one of the transport shelves 16 of the drying plant which shelf has been in correct position adjacent to and level with the transporting band. The transfer takes place by means of unloading means 17 which is moved forwards and backwards and may be of a conventional design. In contrast to the loading means 8 the unloading means 17 is designed with only one pushing plate 17a wherefore the three bars 9, 10 and 11 of the set of the sugar lumps during transfer are pushed together into a compact unit 18 of sugar cubes located close to each other. All the sugar cubes now support each other and the set may without any risk be transported through the drying plant.

The control of the stop means 13 being arranged over the transport band may suitably be carried out automatically by means of electro-magnets which are governed by means of impulses from two photoelectric units 19 and 20 located along the transport band. As evident from FIG. 3, one of the photoelectric units is located at the stop means 13 and the other is located in advance of said means reckoned in the direction of the transport. The distance between the units corresponds to the length of the pressed sugar bars. FIG. 3 illustrates a diagram of a circuit for automatically governing the system. 19 and 20 designate the two photoelectric units; each comprising a source of light 19a and 20a and a relay 19b and 20b equipped with a photoelectric cell 19e and 20e. The relay 19b is provided with a control coil 19c and a switch 19d actuated by said coil. The corresponding details for the relay 20b are designated 20c and 20d respectively. The switches 19d and 20d are connected in a control circuit 21 for an auxiliary relay 22 equipped with a control coil 22a and a two-way switch 22b actuated by said coil and a hold-in contact 22c. The two-way switch 22b is connected in auxiliary circuit 23 of the lifting solenoids 24 and 25, the coils of which are designated 24a and 25a respectively. These two lifting solenoids actuate a lever 26 arranged on the shaft 15 for the stop means 13 and are so arranged that energization of the solenoid 24 pushes the stop means down against the transport band while energization of the solenoid 25 lifts the same upwards. The illustrated automatic governing is only one exemplifying embodiment and without departing from the invention may be varied in different manners.

What we claim is:

1. In manufacturing sugar lumps, apparatus for transferring to a drying plant undried preformed moist and fragile lumps from a forming press which produces a set of lumps as separate pieces of the desired final size in a plurality of transverse and longitudinal rows spaced apart by a predetermined distance, comprising an intermittently driven transporting band parallel to said longitudinal rows and situated between the press and the drying plant and having loading and unloading means at the press and plant respectively, the improvement wherein the loading means comprises a frame having at least two pulling plates parallel with the transporting band, less in number than said longitudinal rows and spaced apart to register with and engage in the spacing between said longitudinal rows, said frame being mounted for reciprocation transversely of said band, during retraction being in a raised position above said set and during advancement being in a lowered position to engage said set and load said set on the band to form thereon at least two bars consisting of a plurality of sidewise-abutting longitudinal rows, a stop edge disposed intermediate said loading and unloading means transversely over the supporting band, and mounted to be raised and lowered to serve as a stopping means, actuating means to hold said edge lowered in contact with the transporting band to engage the bars thereon and displace said transverse rows longitudinally to close the spacing therebetween, and thereafter to raise and hold raised said edge to permit said closed bars to travel to said unloading means, and wherein the unloading means comprises a pulling member made with only one pulling plate mounted for reciprocation transversely of said band to displace said bars into sidewise-abutting relation for unloading into said drying plant.

2. Apparatus according to claim 1 wherein said acuating means includes solenoid means controlled by two photoelectric units disposed adjacent the transporting band and spaced apart therealong a distance corresponding to the length of the closed bars, whereby said stop edge is raised when said bars are closed.

References Cited in the file of this patent

UNITED STATES PATENTS

| | | |
|---|---|---|
| 131,899 | Partz | Oct. 1, 1872 |
| 1,627,391 | House | May 3, 1927 |
| 2,001,332 | Ross | May 14, 1935 |
| 2,171,362 | Gulliksen | Aug. 29, 1939 |
| 2,770,202 | Garfunkel | Nov. 13, 1956 |
| 3,005,420 | Wiklund et al. | Oct. 24, 1961 |